United States Patent [19]

Taylor

[11] Patent Number: 4,457,578
[45] Date of Patent: Jul. 3, 1984

[54] ELECTRICAL TERMINAL FOR SOLAR PANEL

[75] Inventor: Dan E. Taylor, Oxnard, Calif.
[73] Assignee: Atlantic Richfield Company, Los Angeles, Calif.
[21] Appl. No.: 333,210
[22] Filed: Dec. 21, 1981
[51] Int. Cl.³ ............................................. H01R 4/30
[52] U.S. Cl. .................................................. 339/263 R
[58] Field of Search .......... 339/263 R, 263 B, 263 E, 339/263 L, 263 S, 214 R, 214 C, 219 R

[56] References Cited

U.S. PATENT DOCUMENTS

| | | | |
|---|---|---|---|
| 597,002 | 1/1898 | Jewell | 339/263 R |
| 1,997,091 | 4/1935 | Usselman | 339/263 R |
| 4,067,764 | 1/1978 | Walker et al. | 156/267 |
| 4,077,691 | 3/1978 | Hagermo | 339/263 R |
| 4,224,081 | 9/1980 | Kawamura et al. | 136/251 |

Primary Examiner—Joseph H. McGlynn
Assistant Examiner—David L. Pirlot
Attorney, Agent, or Firm—Albert C. Metrailer

[57] ABSTRACT

An electrical terminal for use in laminated photovoltaic solar panels including a terminal post having a first end for connection to an external electrical lead and a second end flattened to form a radially extending flange, in combination with a generally flat terminal plate having an aperture through which the first end of the post is positioned to extend from a first side of the plate while the flange is bonded to a second side of the plate.

5 Claims, 3 Drawing Figures

ELECTRICAL TERMINAL FOR SOLAR PANEL

BACKGROUND OF THE INVENTION

The present invention relates to electrical terminals for use in photovoltaic solar panels and more particularly, to a terminal having improved mechanical strength.

The manufacture and use of photovoltaic solar cells are well known. It has become common practice to package large numbers of such solar cells in series or parallel strings to form panels or modules. Such panels have become standard commercial products. Methods for manufacturing such panels are disclosed in U.S. Pat. No. 4,067,764 issued to Walker et al. on Jan. 10, 1978 and U.S. Pat. No. 4,224,081 issued to Kawamura et al. on Sept. 23, 1980. As shown by these patents, it is standard practice to use one or more clear glass or structural plastic sheets as a superstrate to which the light receiving faces of solar cells are mounted. The cells are normally sandwiched between layers of relatively soft plastic materials such as polyvinylbutyral (PVB) or silicone resin. These soft laminating materials bond the cells to the superstrate and simultaneously act as a soft resilient protective layer which relieves stresses and protects the relatively brittle cells from mechanical forces. A protective layer is typically bonded over the back of the panel to provide protection from the environment including both weather and mechanical forces.

In manufacture of such solar panels, it is necessary that at least two electrical terminals be provided for making contact with the string of solar cells within the panel. With reference to FIG. 1, there is illustrated a prior art electrical terminal arrangement. FIG. 1 is an exploded cross-sectional view of the electrical terminal region of a solar panel with the light receiving face shown at the bottom. The lowermost layer 10 is a glass sheet which also forms the superstrate or primary mechanical structure for the panel. Immediately above glass plate 10 is a first layer 12 of PVB. A metal plate 14, typically made of tinned copper is positioned above layer 12. A second layer 16 of PVB is positioned above plate 14. An outer protective layer 18 is positioned on top of PVB layer 16. A cylindrical metal stud 20 is positioned within apertures 22 in layers 16 and 18. A lower end 24 of stud 20 is soldered to plate 14. Stud 20 is internally threaded and a bolt 26 is provided for attaching external leads to stud 20. A metal ribbon 28 is soldered to an edge of terminal plate 14 and extends between laminate layers 12 and 16 to make contact to solar cells within the module.

In the prior art structure, the stud 20 was soldered to terminal plate 14 by an induction heating technique performed after the lamination process was complete. This arrangement greatly facilitated the lamination process since the various layers 10, 12, 14, 16 and 18 could be assembled to an essentially flat structure before the application of heat and pressure to form the completed panel. However, it has been found in practice that various oxides and/or fluorides attack the solder connecting stud 20 to plate 14. Even though all terminals undergo mechanical strength tests, failures were encountered after aging both under field conditions and relatively protected storage conditions. When the junction between stud 20 and plate 14 fails, the entire panel becomes essentially useless and must be replaced.

SUMMARY OF THE INVENTION

Accordingly, an object of the present invention is to provide an improved electrical terminal for use in laminated photovoltaic solar panels.

An electrical terminal according to the present invention includes a terminal post having a first end adapted for connection to an external electrical lead and a second end including a flattened flange extending radially outward, which post is attached to an essentially flat terminal plate by positioning the post through an aperture in the plate so that it extends from a first side of the plate and attaching the post flange to the second side of the plate. In a preferred form, the terminal plate is recessed so that the second end of the post lies flush with the second side of the terminal plate.

BRIEF DESCRIPTION OF THE DRAWINGS

The present invention may be better understood by reading the following detailed description of the preferred embodiments with reference to the accompanying drawings wherein.

DESCRIPTION OF THE PREFERRED EMBODIMENTS

Figure 1:
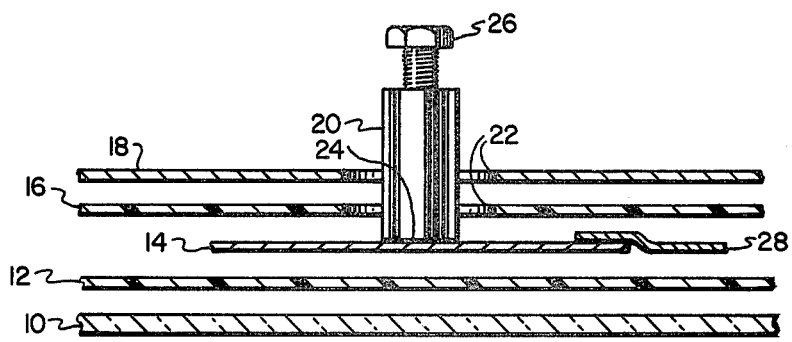
FIG. 1, as described above, is a cross-sectional illustration of a prior art solar panel laminate structure showing in particular the electrical connector portion thereof.
Figure 2:
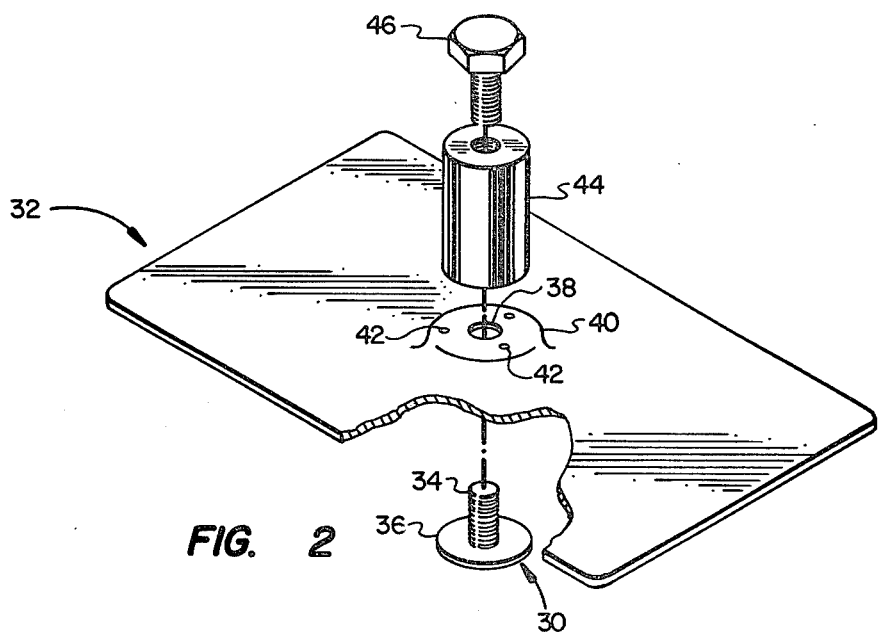
FIG. 2 is an exploded perspective view of an improved electrical terminal according to the present invention.
Figure 3:
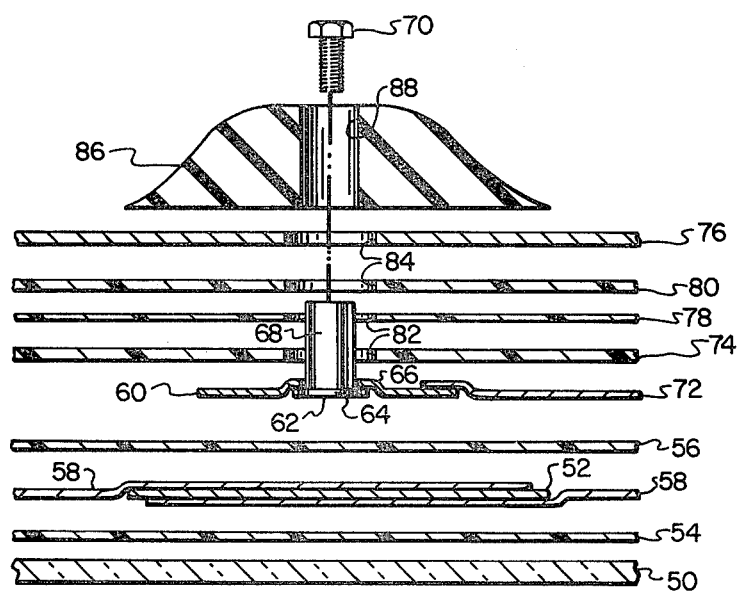
FIG. 3 is an exploded cross-sectional view of a solar panel assembled with an improved electrical terminal according to the present invention.

With reference to FIG. 2, there is illustrated, in exploded perspective view, one embodiment of an electrical terminal according to the present invention. The electrical terminal comprises two basic parts, the first being a post portion 30 and the second being a plate portion 32. The terminal post 30 includes a first portion 34 adapted for connection to an external lead. In this FIG. 2 embodiment, the first portion 34 is a conventional screw threaded shaft having a standard 10/24 thread and being approximately 0.125 inches long. On a second end of the post 30, there is formed a radially extending flange 36 which in this preferred embodiment, is 0.01 inches thick and has a diameter of 0.375 inch. The post 30 is preferrably formed from copper and the flange 36 is formed integrally with the threaded portion 34 of the post. The terminal plate portion 32 is preferrably formed from 0.01 inch thick copper sheet which in this embodiment, is cut into a rectangular plate having dimensions of 1.5 inch by 2.0 inch. An aperture 38 is formed in the center of plate 32 for receiving the threaded portion 34 of post 30. In this preferred embodiment, the plate 32 has been upset as illustrated at 40 to form a recess on the lower side. The recess, as more clearly illustrated in FIG. 3, is sized to receive flange 36 of post 30. In addition, it is preferred that a number of dimples 42 be punched in the recess portion 40 to form point contacts with flange 36. These contact points allow for high quality spot welding of the flange 36 to the plate 32. If, as preferred, both post 30 and plate 32 are made from copper material, spot welding is the preferred method for attaching post 30 permanently to plate 32. If, however, post 30 is made from brass, the flange 36 may be attached within upset 40 by a soldering or brazing process and the dimples 42 would not be necessary. In this FIG. 2 preferred embodiment, the actual connection to an external lead is facilitated by use of an internally threaded stud 44 and bolt 46. After assembly of the completed terminal plate into a panel, as will be described below with respect to FIG. 3, the stud 44 would be threaded onto post 30 with the result that the external appearance of the terminal would be essentially identical to that illustrated in FIG. 1. The bolt 46 would be used to attach an external lead to stud 44.

As noted in the description of the prior art devices, the laminated panel structure is essentially flat throughout the laminating process. It will be appreciated that the short threaded shaft 34 illustrated in FIG. 2 should not cause any major interference with the standard laminating processes. This is because the upper sealing member in the conventional laminating process is a fairly heavy rubber sheet which can easily conform to the post 30 without damage. If, however, a substantially longer threaded section 34 of the post 30 is employed or the stud 44 is formed integrally with the post 30 as illustrated in FIG. 3, then a modification of the lamination process as described below will probably be required.

With reference now to FIG. 3, there is illustrated, in exploded view, the laminated structure of a solar panel in accordance with another embodiment of the present invention. In addition to the improved terminal design, this embodiment differs from the prior art structure of FIG. 1 in that the electrical terminal is positioned immediately behind or on top of one of the solar cells housed in the panel. The complete laminated structure will first be described. As in the FIG. 1 embodiment, this structure is supported primarily by a glass superstrate 50. Positioned immediately above superstrate 50 is the basic solar panel structure including a solar cell 52 positioned between first and second PVB layers 54 and 56 respectively. Ribbon leads 58 are also illustrated making contact between solar cell 52 and other cells forming a complete string. Positioned above PVB layer 56 is another embodiment of the improved electrical terminal of the present invention including a terminal plate 60 which may be identical to plate 32 of FIG. 2 and a terminal post 62. The post 62 has been bonded to plate 60 by preferably welding the flange portion 64 to the lower side of plate 60. As illustrated, an upset 66 has been provided so that the lower surface of post 62 is essentially flush with the lower surface of plate 60. Post 64 differs from the FIG. 2 embodiment in that its upper portion is in the form of an internally threaded stud 68 similar to the stud 44 of FIG. 2. However, in this FIG. 3 embodiment, the stud 68 is formed integrally with flange 64. A bolt 70 is provided for connecting an external lead to the panel. It will be appreciated, of course, that bolt 70 would not normally be connected to stud 68 until after the structure has been laminated. A ribbon connector 72 is shown soldered to one edge of plate 60 for making connection to the solar cell string of which cell 52 is a portion. Above terminal plate 60, there is positioned at least a third PVB layer 74 and a protective back layer 76. In this preferred embodiment, the protective back layer 76 includes a metal foil coated with a protective layer of polyvinyl fluoride which is sold commercially under the trademark Tedlar ™. In this preferred embodiment, an additional two layers 78 and 80 are provided between PVB layer 74 and the back sheet 76. The layer 78 is a high voltage insulating layer preferably comprising a sheet of polyester material such as that sold commercially under the trademark Mylar ™. Layer 80 is a fourth sheet of PVB material used for bonding sheet 78 to back sheet 76. As illustrated, apertures 82 and 84 are appropriately formed within sheets 74, 76, 78 and 80 to allow the various layers to be laid together in preparation for lamination. If desired, apertures 82 may be somewhat smaller than apertures 84 to aid in electrically isolating the metal foil in back sheet 76, which is normally grounded, from terminal plate 60.

As discussed above, a terminal post 68 having substantial length can potentially cause problems in laminating the solar panel. A stress relief device 86 is illustrated in FIG. 3 for avoiding such problems. Device 86 is basically a conically shaped rubber block having an aperture 88 sized for receiving terminal post 68. The block 86 would be used only during the actual lamination process and will be properly treated to prevent its adhesion to any of the panel layers. In addition to preventing damage to the laminating device itself, the block 86 also would prevent excessive forces being applied to the terminal plate 60 and post 62. This reduction in force is important since, as shown in FIG. 3, the terminal structure is positioned directly above solar cell 52. The laminating forces should be applied as evenly as possible to avoid cracking of cell 52.

As noted above, the upset 66 is preferably sized so that the bottom of post 62 is essentially flush with the bottom of plate 60. This arrangement also helps insure a smooth uniform application of forces to cell 52 during the lamination process. In addition, it prevents any edges or points from penetrating PVB layers 56 and causing an internal short circuit between terminal plate 60 and cell 52 or the interconnecting leads 58.

Although the present invention has been illustrated and described with respect to particular apparatus and methods of use, it is apparent that various other modifications and changes can be made within the scope of the present invention as defined by the appended claims.

What is claimed is:

1. An electrical terminal for use in a laminated photovoltaic solar panel comprising:
   a terminal post having a first end adapted for connection to an electrical lead external to a solar panel and a generally flattened flange extending radially outward from a second end, and
   a substantially flat terminal plate formed from a metal sheet and adapted for bonding within the laminated photovoltaic solar panel, said plate having an aperture through which said terminal post is positioned to extend from a first side of said plate and said flange welded to a second side of said plate.

2. An electrical terminal according to claim 1 wherein a recess is formed in the second side of said terminal plate so that the second end of said terminal post is essentially flush with said plate second side.

3. An electrical terminal according to claim 1 wherein said terminal post is externally threaded.

4. An electrical terminal according to claim 1 wherein said terminal post is internally threaded.

5. An electrical terminal for use in a laminated photovoltaic solar panel comprising:
   a terminal post having a first end adapted for connection to an electrical lead external to a solar panel and a generally flattened flange extending radially outward from a second end, and
   a terminal plate formed from a metal sheet, said plate having an aperture through which said terminal post is positioned to extend from a first side of said plate and said flange electrically connected to a second side of said plate,
   wherein said terminal post flange is welded to said terminal plate.

* * * * *